Sept. 4, 1962 W. H. JACOBS ETAL 3,052,791
BEVERAGE MAKER
Filed Nov. 20, 1958 3 Sheets-Sheet 1

Inventors:
William H. Jacobs,
Walter Witzel,
by Arthur D. Thomson
Attorney

Sept. 4, 1962 W. H. JACOBS ETAL 3,052,791
BEVERAGE MAKER
Filed Nov. 20, 1958 3 Sheets-Sheet 2

Inventors:
William H. Jacobs,
Walter Witzel,
by Arthur D Thomson Attorney

Sept. 4, 1962  W. H. JACOBS ETAL  3,052,791
BEVERAGE MAKER
Filed Nov. 20, 1958  3 Sheets-Sheet 3
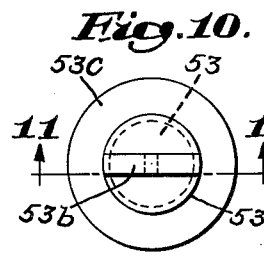
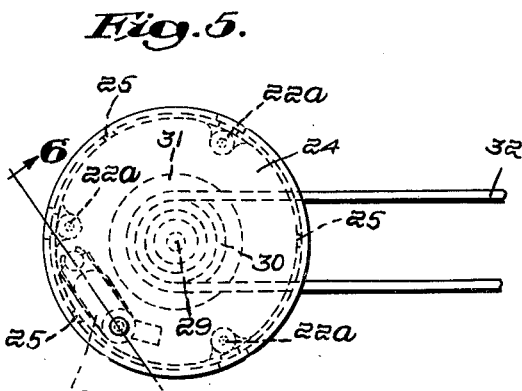
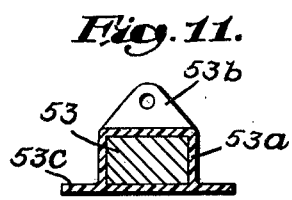
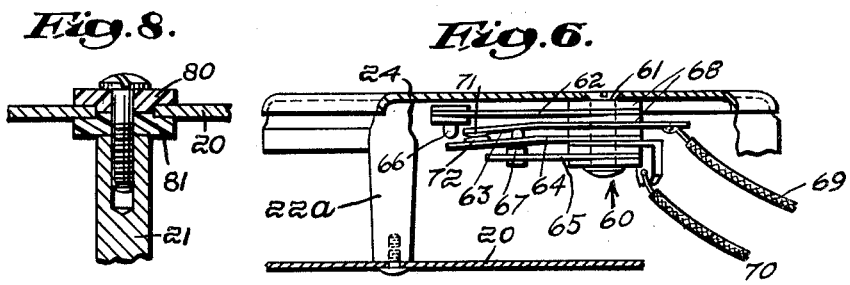
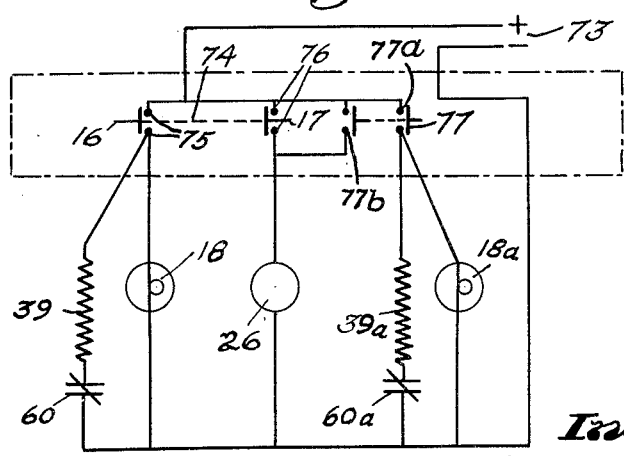
Inventor:
William H. Jacobs,
Walter Witzel,
by Arthur D. Thomson Attorney

3,052,791
BEVERAGE MAKER
William H. Jacobs, Newton, and Walter Witzel, Harvard, Mass.; said Witzel assignor to Jet Spray Cooler, Inc., Boston, Mass., a corporation of Massachusetts, and said Jacobs assignor to Magic Whirl Dispensers, Inc., Boston, Mass., a corporation of Massachusetts
Filed Nov. 20, 1958, Ser. No. 775,247
2 Claims. (Cl. 219—43)

This invention relates to beverage makers, and more particularly to devices for making hot beverages, using powdered chocolate or coffee, for example, or for heating soups.

The general object of the invention is to produce a hot beverage maker which will quickly mix and heat beverages, which will maintain the beverage at the desired temperature for serving without attention from the operator, which will prevent the beverage from burning and sticking to the pot, which permits use of a glass pot for the beverage without danger of breakage in case the pot runs dry, which is efficient and economical to run, and in which all the parts in contact with the beverage can be readily kept in sanitary condition.

The device consists in general of a cooking pot of glass, or other non-magnetic material, having a cover from which a magnetic stirring element is suspended, and a stove having a heating element and a magnetic member for driving the stirring element. The stove has a heat conductive plate, on which the pot is supported, and an electric heating element surrounding, but out of contact with, the plate. A heat reflective metal ring partly encloses the heating element and serves both to concentrate the heat and to center the pot so that it cannot touch the heating element. Current to the heating element is controlled by a thermostatic element mounted on the plate. Other novel features of the invention will be apparent from the following detailed description.

In the drawings illustrating the invention:

FIG. 5 is a top view of the center plate assembly, taken, for example, along line 5—5 of FIG. 4;

FIG. 6 is a fragmentary enlarged cross-section taken along line 6—6 of FIG. 5;

FIG. 7 is a bottom view of the stove;

FIG. 8 is a fragmentary cross-section of one of the mounting studs for the motor;

FIG. 9 is a wiring diagram of the electrical system for the device;

FIG. 10 is a plan view of a preferred form of stirring element; and

FIG. 11 is a cross-section taken along line 11—11 of FIG. 10.

Figure 1:
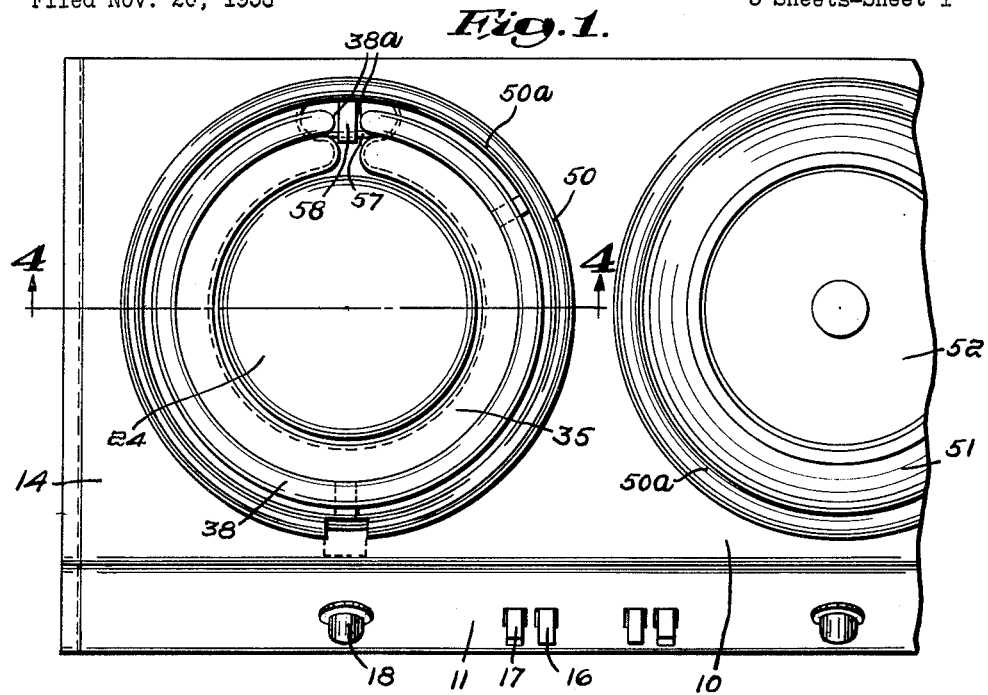
FIG. 1 is a plan view, partly broken away, of a multiple station beverage maker constructed according to the invention.

The parts forming the stove and control system of the device are mounted on a stand, generally indicated by the numeral 10, formed, for example, of sheet metal and including a front panel 11, a removable rear panel 12, a bottom panel 13, a top panel 14, and an end panel 15, and a similar end panel (not shown) at the opposite end of the device. The switches 16 and 17, and the pilot light 18, which form part of the electrical system for controlling the device, are mounted on the front panel.

The parts of the magnetic drive are mounted on a channel-shaped chassis 20. Mounted on the chassis is a ring 22, preferably made of a heat-insulating material, such as plastic, having three posts 22a which are screwed to the chassis and support the ring in spaced relationship thereto. At the position of each leg, the ring has a notch 23 leading up from its lower edge. A plate 24, of non-magnetic heat-conductive material, such as aluminum, is mounted on the ring 22, and has three tabs 24a which are clinched into notches 23. Ring 22 also has three notches 25 in its upper edge, spaced equidistantly between the posts. These notches provide air passages between the ring and the rim of the plate 24.

Suspended from the chassis 20 by a number of posts 21 is an electric gear motor of generally conventional type including a field coil 26, a rotor 27, a gear box 28, and a drive shaft 29 which extends up through the chassis. A pulley 30 is mounted on the drive shaft, and a permanent magnet 31 is mounted on the hub 30a of the pulley. The pulley engages a belt 32 which may be used to drive a similar pulley and magnet assembly at another station on the stand.

Figure 3:
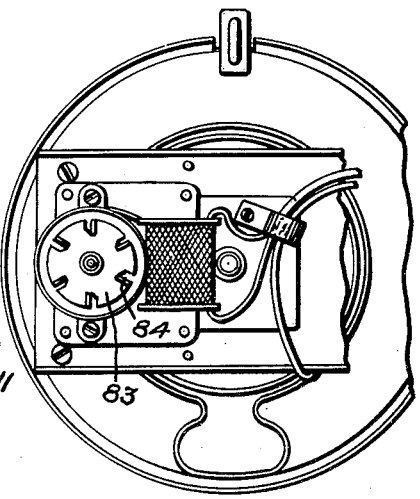
FIG. 3 is a partial cross-section taken along line 3—3 of FIG. 2.
Figure 3:
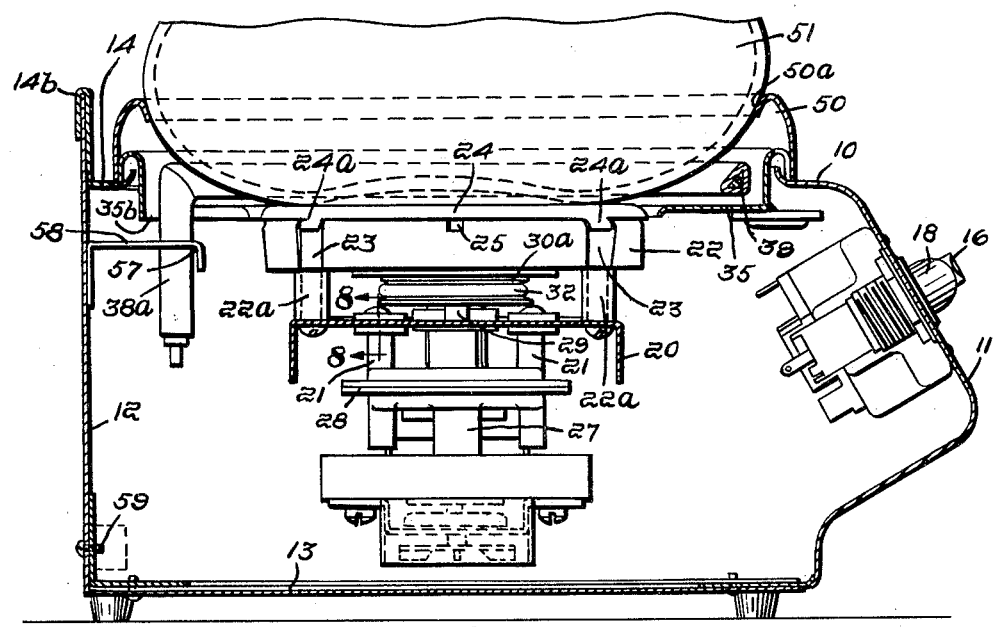
Figure 4:
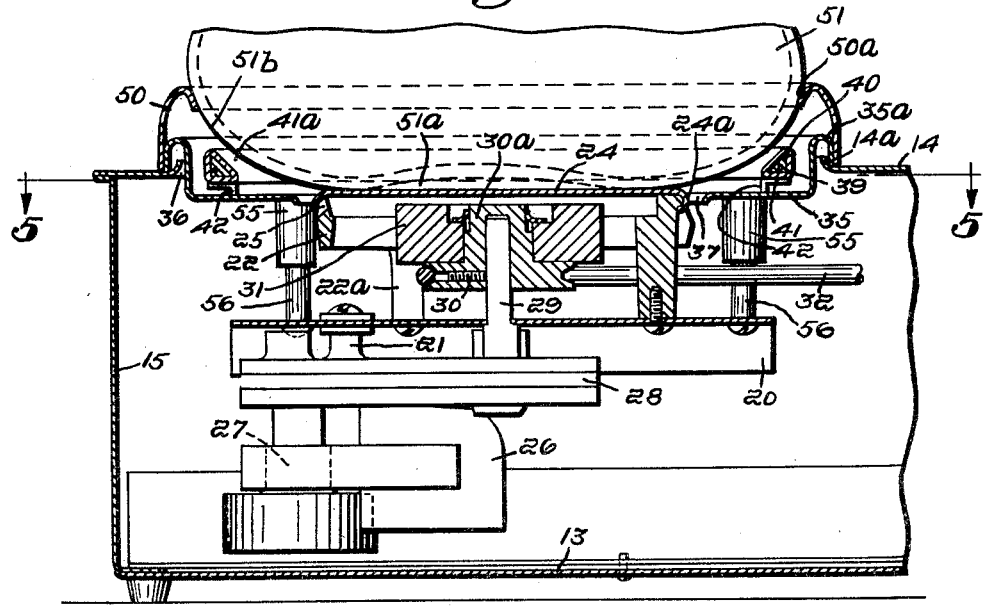
FIG. 4 is a cross-section taken along line 4—4 of FIG. 1.

A ring-shaped plate 35 having an upwardly extending inverted U-shaped rim 35a is mounted on top panel 14 in an opening 36. This panel has an upturned lip 14a which engages the outer portion of rim 35a to hold plate 35 in centered position with respect to the opening. On the under side of plate 35 are a number of studs 55 into which bolts 56 are threaded. The bolts pass through chassis 20 and secure the chassis to plate 35 which is, in turn, suspended from panel 14. The plate 35 has a central opening 37 in which plate 24 is disposed and spaced away from plate 35 all around. On plate 35 is mounted an electric heating element 38, of a conventional type used for stoves, for example, and consisting generally of a resistance element 39 surrounded by insulation 40 and enclosed in a metal jacket 41. The jacket is triangular in cross-section and has a bevelled surface 41a facing inward. The heating element is supported in spaced relationship on plate 35 by means of several tabs 42 welded to the jacket 41 and resting loosely on the plate. The heating element 38 is in the shape of a loop and has a pair of down-turned end extensions, one of which, 38a, is shown in FIG. 3, providing terminals for electric connections to the heater. A rod 57 between the heater extensions is engaged by a bracket 58 on back panel 12 to hold the heater assembly down.

A ring-shaped bezel 50 is pressed around the outside of rim 35a and rests on the top panel 14. Around its upper edge the bezel has an inwardly and downwardly curved rim 50a which engages a cooking pot 51 when the latter is in place on the stove.

The bezel can be removed merely by lifting, to simplify cleaning the unit. The heating element 38 can likewise be tilted up to clean the ring 35. Ring 35 can be lifted sufficiently to clean under its edge, while bracket 58 holds the ring against rotation and prevents strain on the wiring. Access to the stove and drive unit is provided by the back panel 12. This panel is engaged under a lip 14b on top panel 14, and held at the bottom by screws 59. When the screws are removed, bracket 58 can be disengaged from rod 57 by tilting the back panel. Element 38 and the whole stove and drive assembly, which is suspended from ring 35, can then be lifted out.

The pot 51 is a round pot of a generally conventional style used for coffee makers, having a flat bottom 51a and a curved lower side wall portion 51b. The bottom of the pot rests on plate 24, and plate 35 and heating element 38 are so proportioned as to be spaced from the pot when the latter is centered on plate 24 by bezel 51. The pot is thus protected against direct contact with the heating element. To insure maximum heating efficiency, plate 35 and bezel 50 are made of heat reflective material, such as polished aluminum. These parts form a substantially continuous enclosure for the heating element, on the bottom and outside, so that substantially all of the heat is directed toward the pot.

Figure 2:
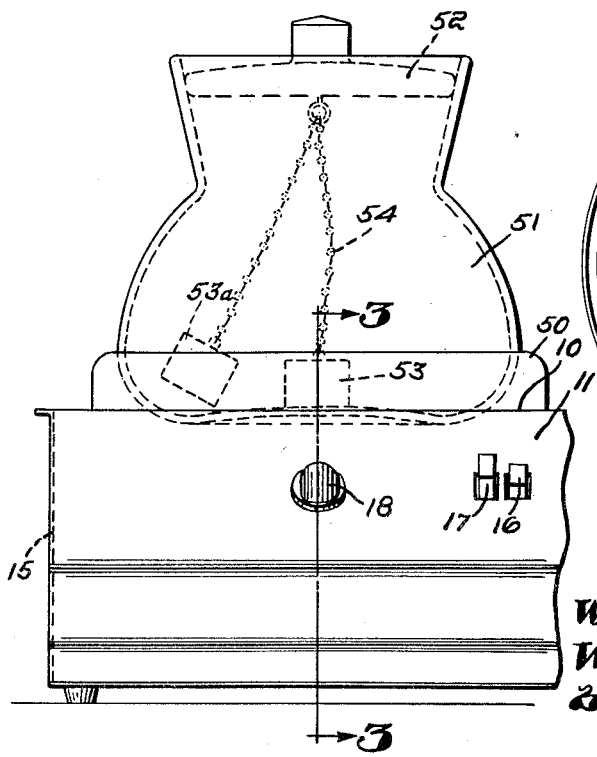
FIG. 2 is a front elevation of one station of the device of FIG. 1.

The pot 51 is made of glass or other non-magnetic material. The pot has a cover 52 from which a vertically polarized permanent magnet 53 is suspended by means of a chain 54. The chain is preferably long enough so that the magnet rests on the bottom of the pot when at rest, but will swing clear of the bottom when attracted by magnet 31, which is polarized horizontally so as to draw magnet 53 toward the side of the pot, as indicated by the dotted outline 53a in FIG. 2.

The form of magnetic stirring element shown in FIGS. 10 and 11 is preferred for glass pots. Here the magnet 53 is encased in a casing 53a molded, for example, from nylon or other resilient, relatively inert plastic material. The casing has a projecting lug 53b to which the chain is attached, and a thin flexible flange 53c all around. The flange acts as a shock absorber and prevents the magnet from breaking the glass in case the pot is moved suddenly enough to cause the stirring element to strike the side of the pot.

A thermostatic switch, generally indicated by the numeral 60, is mounted under plate 24, as shown in FIGS. 5 and 6. A stud 61 passes through the plate 24 and supports a bimetallic element 62, a leaf spring 63, a leaf spring 64 and a rigid plate 65. Element 62 carries a stud 66 which may engage the outer end of spring 64 to bend this spring down. Plate 65 carries a stop 67 which passes through spring 64 and engages leaf 63 to hold it in a predetermined position. Stop 67 is mounted on a screw 67a which is threaded into plate 65 and can be turned to adjust the position of the stop and thus adjust the temperature at which the thermostat opens. The leaves and thermostatic element are separated from one another and insulated from stud 61 by a series of insulating washers 68. A pair of leads 69 and 70 are connected to leaves 13 and 64, respectively. A pair of contacts 71 and 72 are mounted on the outer ends of leaves 63 and 64. The switch is constructed so that, when heated beyond a desired temperature, element 62 will bend downward, and stud 66 will press leaf 64 down to break the engagement between contacts 71 and 72. On cooling, the bimetallic element and leaf 64 return to their original position, re-engaging the contacts.

To protect the motor from the heat of the heater element, the studs 56, which carry chassis 20, are made of a material with relatively low heat conduction properties. In addition, an insulating mounting shown in FIG. 8 is provided for suspending the motor from the chassis. A pair of grommets 80 and 81, made of heat insulating material, are mounted in a hole in the chassis, and the screw 82 which engages post 21 passes through these grommets. There is thus no metal-to-metal contact between the screw or the post and the chassis. Finally, a fan 83 having fins 84 adapted to circulate air upward is mounted to be rotated by rotor 27 and assist in cooling the motor.

The wiring diagram for the device is illustrated in FIG. 9. The device is connected to a current supply source 73 which may be A.C. or D.C. One side of the supply is connected to one side of a double action push button switch 74, which is operated by means of switch buttons 16 and 17 on the panel and has two sets of contacts 75 and 76. These contacts are closed by pressing in button 16 and opened by pressing in button 17. Contacts 76 are connected in series with the motor 26, and contacts 75 are connected in series with the heater element 39 and the thermostat 60. The pilot light 18 is connected in parallel with the heater element and thermostat.

To operate the stove, button 16 is pushed, closing the circuit to the motor and to the heater element 39. The pilot light 18 is also illuminated. The pot filled with the desired amount of beverage mixture is then placed on the stove. The magnet 53 is driven by magnet 31 to stir the beverage continuously while the pot is on the stove. The beverage is thus thoroughly mixed and prevented from sticking. When the beverage reaches the desired temperature, the thermostat switch 60 opens, shutting off the current to the heating element. If the beverage cools below this temperature, the thermostatic switch will close again and reheat the beverage to the necessary extent.

The thermostatic switch is mounted very close to the bottom of the pot, and is isolated from the electric heating element 38 by the air gap between plate 35 and plate 24. The switch is therefore quickly responsive to variations in the temperature of the liquid in the pot, and the temperature can thus be accurately maintained within a narrow range. The pot does not have any direct contact with the heating element and the thermostatic switch is set to maintain the beverage at a temperature below the boiling point, for example, about 180° F. This temperature is suitable for milk beverages and cream soups, and the continuous stirring provided by the magnetic stirring unit prevents the beverage from sticking to the bottom. A stirring speed of about 200 r.p.m. is preferred, as a faster speed may cause a suspension, like cocoa, to separate. If the pot should run dry, the thermostatic switch will shut off the current to the heater when the preset temperature of the thermostat is reached, thus preventing overheating. Breakage of the pot is thus prevented, as the heat-resistant types of glass used for cooking pots will readily withstand temperatures below the boiling point.

If the stand is provided with more than one cooking station, the other stove assemblies are similar to the one here described. As previously stated, the motor may be connected to drive a number of magnets, similar to magnet 31, simultaneously through suitable belt and pulley drives. Each stove has a heating element and thermostatic switch similar to element 38 and switch 60. In FIG. 9, the heating element 39a, thermostatic switch 60a, and pilot light 18a of a second stove unit are shown connected to a separate switch 77. Switch 77 carries two pairs of contacts 77a and 77b. Contacts 77b are connected in the motor circuit, and contacts 77a in the heater circuit for the second stove unit. Closing switch 77 thus starts the motor and also energizes heater 39a and the pilot lamp 18a. The second stove unit can thus be switched on and off independently of the first. Additional units can be wired in the same manner.

Although the device is intended primarily for making hot beverages, it is also useful for cooking or heating sauces and other foods which require constant stirring.

What is claimed is:

1. A cooking device comprising a cooking pot adapted to contain liquid and a stove, said stove including a plate on which said pot is supported in heat-conducting relationship, an electric heating element surrounding said pot in spaced relationship thereto and to said plate, a heat reflector surrounding said heating element, said stove including a continuous air gap separating said plate from said heating element and reflector, and said reflector having a reflecting surface adapted to direct toward said pot substantially all heat emitted by said heating element, a thermostatic switch mounted on said plate in proximity to said pot, and an energizing circuit for said heating element, said switch being connected in said circuit to control current to said heating element.

2. A cooking device as described in claim 1, said pot and said plate being made of non-magnetic material, said pot having a magnetic agitating member disposed therein, and said stove including magnetic means disposed below and spaced from said plate and adapted to drive said agitating member to stir liquid in the pot.

(References on following page)

References Cited in the file of this patent

UNITED STATES PATENTS

| | | |
|---|---|---|
| 1,983,212 | Wolcott | Dec. 4, 1934 |
| 2,166,728 | Page | July 18, 1939 |
| 2,180,733 | Fowler | Nov. 21, 1939 |
| 2,274,607 | Cohen | Feb. 24, 1942 |
| 2,287,584 | Weeks | June 23, 1942 |
| 2,559,877 | Ihle et al. | July 10, 1951 |
| 2,715,176 | Schoberle | Aug. 9, 1955 |
| 2,743,910 | Melville | May 1, 1956 |
| 2,828,950 | Stilwell | Apr. 1, 1958 |
| 2,837,320 | Baron | June 3, 1958 |
| 2,844,363 | Clark | July 22, 1958 |

FOREIGN PATENTS

| | | |
|---|---|---|
| 131,024 | Australia | Oct. 3, 1946 |